Nov. 8, 1938.    A. NAGEL    2,135,988
COUPLED RANGE FINDER CAMERA
Filed May 1, 1937

August Nagel
INVENTOR.

BY

ATTORNEYS

Patented Nov. 8, 1938

2,135,988

UNITED STATES PATENT OFFICE 2,135,988

COUPLED RANGE FINDER CAMERA

August Nagel, Stuttgart, Germany, assignor to Eastman Kodak Company, Rochester, N. Y., a corporation of New Jersey Application May 1, 1937, Serial No. 140,232
In Germany September 21, 1936

4 Claims. (Cl. 95—44)

This invention relates to a combination camera and range finder. It relates particularly to a means for coupling the movements of the camera focusing adjuster and the light deviating means of the range finder.

It is an object of the invention to provide a simple and accurate coupling between the range finder light deviating means and the camera focusing adjuster. It is a special object to provide such a coupling adapted for use with a camera focusing adjuster of the sliding bed type.

It is also a special object of the invention to provide such a coupling means particularly suitable for use with cameras of the self-erecting front type, or for use with cameras of the slide block type.

It is a further object of the invention to provide a coupling means employing a cam, the movement of which is relatively long compared to the movement of the camera focusing adjuster. Thus, the invention provides very accurate control of the range finder light deviating means.

Further objects and advantages of the invention will be apparent from the following drawing in which similar reference numerals refer to similar details throughout and in which.

Figure 1:
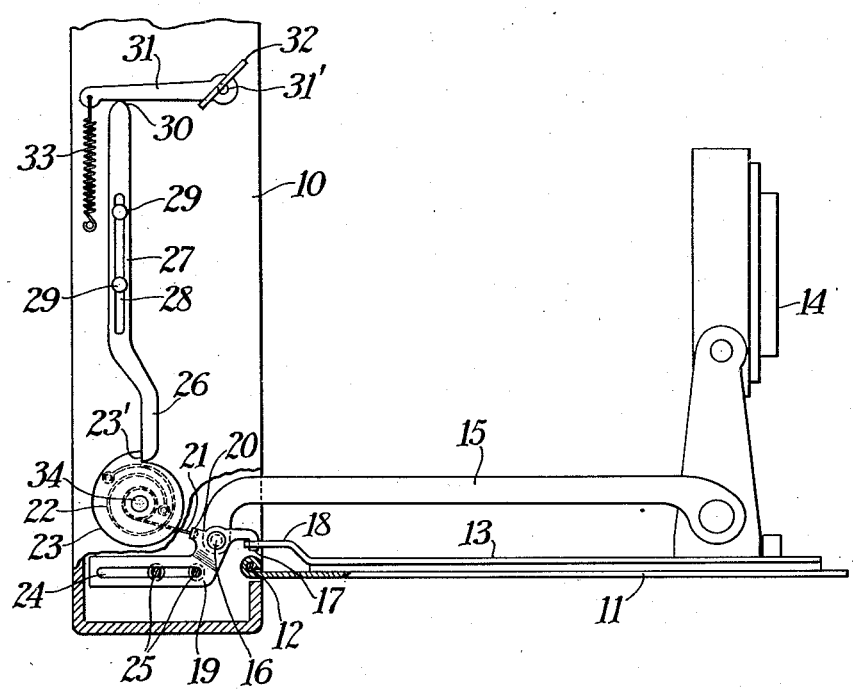
Fig. 1 is an elevation partly broken away of a camera incorporating one embodiment of the invention.
Figure 2:
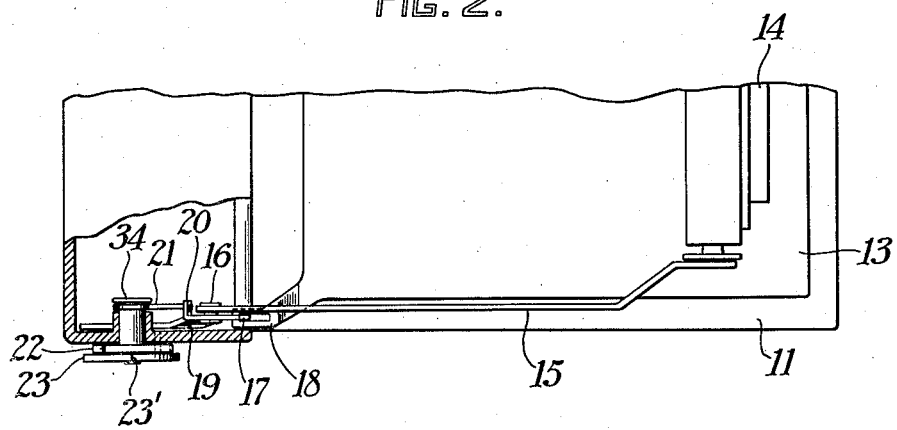
Fig. 2 is a plan, partly broken away, of the arrangement shown in Fig. 1.

In the drawing, a camera of the folding bed type has a housing 10 and a folding bed 11 hingedly attached to the housing 10 at the point 12. A bed plate 13 is slidably secured to the bed 11 by means not shown and supports a lens 14 in a well-known manner. The lens mount is slidably mounted for focusing and may be of any well-known self-erecting type and is provided therefor with an erecting bar 15.

According to this embodiment of the invention, the erecting bar 15 is pivotally attached at the point 16 to a slidable member 19 which is slidably secured by slot 24 therein and pins 25 to the camera housing 10. The sliding member 19 is also provided with a hook 17 which grips an extension 18 on the bed plate 13 when the camera is in operative position.

On the outside of the camera housing, and preferably in a range finder housing not shown, is a rotary cam 23 mounted on a shaft 34 which preferably projects through the camera housing. A spiral spring 22 surrounding the shaft 34 and secured to the camera housing urges the cam to rotate in a clockwise direction as viewed in Fig. 1. A flexible member such as a tape 21 is fastened to the shaft 34 and wrapped thereon. The other end of the flexible member 21 is attached at the point 20 to the sliding member 19.

When the bed plate 13 is moved forward (in any well-known manner, not shown, such as a transverse lever, a rack and pinion or a screw thread) for focusing the camera, this longitudinal movement of the bed plate is transmitted either through the erecting bar 15 or through the grip between the hook 17 and the extension 18 to the slidable member 19 and therefrom through the flexible member 21 to rotate the shaft 34 and the cam 23.

Instead of the flexible member 21, any other suitable structure may be used for translating the sliding movement of the lens mount to rotary movement of the cam such as a rack and pinion.

It is important of course that movement of the slidable member 19 causes a predetermined amount of rotation of the cam about its shaft 34.

A vertical bar 27 having a slot 28 therein is slidably mounted by means of pins 29 to the outside of the camera housing 10. One end 26 of this vertical bar 27 engages the cam shaped surface of the rotary cam 23. The other end 30 of the vertical bar 27 engages a lever 31 which is pivoted at the point 31' and which supports a range finder light deviating means such as a mirror 32. It will be apparent to those skilled in the art that this range finder light deviating means may be of any suitable type such as a rotating prism or variable wedge without departing from the spirit of the invention, providing a correspondingly suitable mount is used therewith. In the embodiment illustrated, engagement between the end 30 of the vertical bar 27 and the lever 31 is maintained by means of a spring 33 urging the lever 31 in a downward direction.

When the camera lens 14 is focused on infinity, the erecting bar 15 and the sliding plate 13, which necessarily move together, are at the innermost limit of their movement as defined by stops such as the pins 25 in the slot 24. In this position, the resilient member 21 is wrapped around the shaft 34 in the direction urged by the spring 22 and the vertical bar 27 is in its lowest position. Also, the end 26 of the vertical bar 27 is in contact with the abutment 23' which occurs between the lowest and the highest points of the cam 23.

As the lens 14 is moved to focus for nearby objects, the movement is transmitted by the erecting bar 15 or the sliding plate 13 to the slidable member 19 to rotate the cam 23 and to raise the vertical bar 27 rotating the lever 31 and thereby adjusting the light deviating device 32 in a predetermined manner. A relatively short longitudinal movement of the lens 14 causes a relatively large rotary movement of the circumference of the cam 23. This arrangement leads to the use of a cam whose shape is simple to manufacture and which provides considerable accuracy for the range finder adjustment.

Having thus described one embodiment of the invention, it is to be understood that the invention is not limited to the specific structure shown but is of the scope of the appended claims.

What I claim and wish to protect by Letters Patent of the United States is:

1. In combination with a camera of the folding bed type and having a housing, a lens, a support for the lens mounted slidably for focusing purposes on the camera bed, a rotary cam mounted on the camera housing and having a shaft whose circumference is greater than the distance moved by the lens support throughout the focusing range, resilient means urging the cam to rotate in one direction, a flexible member fastened to the shaft and adapted to wrap thereon as the cam is rotated in said direction, means connecting the flexible member to the lens support whereby movement of the lens support for focusing the camera is transmitted through the flexible member to cause rotation of the cam, a range finder light deviating means adjustably secured to the camera housing and means including a lever engaging said light deviating means and said cam whereby the former is adjusted in a predetermined manner by rotation of the latter.

2. In combination with a camera having a housing, a bed hingedly attached thereto, a lens, a mount for the lens, a bed plate hingedly carrying the lens mount and secured slidably for focusing purposes to the camera bed, a member slidably mounted on the camera housing, a bar rotatably attached to both said member and the lens mount whereby the lens is erected to operative position as the camera bed is opened, a cam rotatably mounted on the camera housing and having a shaft, resilient means urging the cam to rotate in one direction, flexible means wrapped on said shaft and connected to said slidable member, whereby movement of the lens mount for focusing is transmitted through the erecting bar, the slidable member and the flexible means to cause rotation of the shaft and the cam mounted thereon, a range finder light deviating means adjustably mounted on the camera housing and means engaging said light deviating means and said cam whereby the former is adjusted by rotation of the latter.

3. In combination with a camera having a housing, a bed hingedly attached thereto, a lens, a support for the lens mounted slidably for focusing purposes on the camera bed, a rotary cam mounted in the camera housing and having a shaft, resilient means urging the cam to rotate in one direction, a flexible member wrapped on the shaft and connected to the lens support whereby movement of the latter for focusing purposes causes rotation of the former and the cam, a range finder light deviating means rotatably mounted on the camera housing, a lever attached to the light deviating means and a bar slidably secured to the camera housing engaging the lever and the cam whereby rotation of the latter by the flexible member causes the bar to slide and the lever and light deviating means to rotate.

4. In combination with a camera having a housing, a bed hingedly attached thereto, a lens, a support for the lens mounted slidably for focusing purposes on the camera bed, a member slidably secured to an inner wall of the camera housing, a cam mounted rotatably on a shaft through the camera housing, resilient means urging the cam to rotate, a flexible member fastened to the cam shaft and wrapped thereon, said flexible member also being attached to the slidable member, means connecting said slidable member and the lens support whereby a movement of the latter for focusing is transmitted through the slidable and flexible members to rotate the shaft and cam, a range finder light deviator mounted on the camera housing and means including a lever, engaging the deviator and the cam whereby the former is adjusted by rotation of the latter.

AUGUST NAGEL.